United States Patent
Luo et al.

(10) Patent No.: US 11,134,474 B2
(45) Date of Patent: Sep. 28, 2021

(54) MULTI-USER MULTIPLE INPUT MULTIPLE OUTPUT OPERATION WITH HETEROGENEOUS NUMEROLOGY SYSTEMS

(71) Applicant: QUALCOMM Incorporated, San Diego, CA (US)

(72) Inventors: Tao Luo, San Diego, CA (US); Makesh Pravin John Wilson, San Diego, CA (US); Sony Akkarakaran, Poway, CA (US); Sumeeth Nagaraja, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/784,837

(22) Filed: Oct. 16, 2017

(65) Prior Publication Data

US 2018/0115963 A1    Apr. 26, 2018

Related U.S. Application Data

(60) Provisional application No. 62/411,199, filed on Oct. 21, 2016.

(51) Int. Cl.
*H04W 72/04* (2009.01)
*H04L 27/26* (2006.01)
(Continued)

(52) U.S. Cl.
CPC .......... *H04W 72/04* (2013.01); *H04B 7/0452* (2013.01); *H04L 5/0037* (2013.01);
(Continued)

(58) Field of Classification Search
CPC .... H04W 72/04; H04W 72/12; H04B 7/0452; H04L 7/0037; H04L 5/0037;
(Continued)

(56) References Cited

U.S. PATENT DOCUMENTS 8,670,777 B2    3/2014 Borran et al.
8,923,249 B2    12/2014 Kim et al.
(Continued)

FOREIGN PATENT DOCUMENTS

WO    2008030890 A1    3/2008
WO    2009120828 A1    10/2009
(Continued)

OTHER PUBLICATIONS

Nokia, Alcatel-Lucent, 3GPP TSG-RAN WG1 #86, On resource block grouping and multi-cell coordination aspects for mixed numerology support (Year: 2016).*
(Continued)

*Primary Examiner* — Farid Seyedvosoghi
(74) *Attorney, Agent, or Firm* — Patterson & Sheridan, L.L.P

(57) ABSTRACT

Aspects of the present disclosure provide techniques for transmitting, receiving, and processing multi-user multiple input multiple output (MU-MIMO) signals for heterogeneous numerology systems. An exemplary method performed, for example, by a scheduling entity generally includes signaling an indication of numerology parameters to be used in transmitting first and second multi-user multiple input multiple output (MU-MIMO) signals to first and second user equipments (UEs) using shared resources and transmitting the first and second MU-MIMO signals to the first and second UEs, in accordance with the numerology parameters.

26 Claims, 12 Drawing Sheets

(51) Int. Cl.
  *H04L 5/00* (2006.01)
  *H04W 72/12* (2009.01)
  *H04B 7/0452* (2017.01)

(52) U.S. Cl.
  CPC .......... *H04L 5/0048* (2013.01); *H04L 5/0092* (2013.01); *H04L 27/2602* (2013.01); *H04W 72/12* (2013.01); *H04L 5/0007* (2013.01); *H04L 5/0023* (2013.01); *H04L 5/0051* (2013.01); *H04L 27/2607* (2013.01)

(58) Field of Classification Search
  CPC ... H04L 5/0007; H04L 5/0048; H04L 5/0091; H04L 27/2602; H04L 27/2607; H04L 5/0092; H04L 5/0023; H04L 27/26025
  USPC .......................................................... 370/329
  See application file for complete search history.

(56) References Cited

U.S. PATENT DOCUMENTS

| | | | |
|---|---|---|---|
| 2010/0157924 A1* | 6/2010 | Prasad | H04B 7/0452 370/329 |
| 2010/0285810 A1* | 11/2010 | Ko | H04B 7/0639 455/450 |
| 2012/0039411 A1 | 2/2012 | Khojastepour et al. | |
| 2012/0163335 A1* | 6/2012 | Chung | H04L 5/0037 370/330 |
| 2013/0039348 A1* | 2/2013 | Hu | H04B 7/0613 370/335 |
| 2013/0188630 A1* | 7/2013 | Song | H04L 1/1671 370/338 |
| 2014/0050111 A1* | 2/2014 | Nagata | H04L 25/0204 370/252 |
| 2014/0169487 A1* | 6/2014 | Liu | H04L 27/2601 375/260 |
| 2014/0226735 A1* | 8/2014 | Zhang | H04L 27/2646 375/260 |
| 2014/0314166 A1* | 10/2014 | Gomadam | H04B 7/0639 375/267 |
| 2015/0146654 A1* | 5/2015 | Chu | H04W 72/1289 370/329 |
| 2016/0100413 A1 | 4/2016 | Hwang et al. | |
| 2016/0330300 A1* | 11/2016 | Josiam | H04L 5/0091 |
| 2017/0111930 A1* | 4/2017 | Rajagopal | H04W 74/006 |
| 2019/0149306 A1* | 5/2019 | Gao | H04B 17/309 370/252 |
| 2019/0208482 A1* | 7/2019 | Tooher | H04L 27/2628 |

FOREIGN PATENT DOCUMENTS

| | | |
|---|---|---|
| WO | 2016130175 A1 | 8/2016 |
| WO | 2017065590 A1 | 4/2017 |

OTHER PUBLICATIONS

Intel Corporation: "Overview of New Radio Access Technology Requirements and Designs", 3GPP Draft; R1-162379—Intel 5G NR Overview, 3rd Generation Partnership Project (3GPP), Mobile Competence Centre; 650, Route Des Lucioles; F-06921 Sophia-Antipolis Cedex; France, vol. RAN WG1, No. Susan, Korea; Apr. 11, 2016-Apr. 15, 2016, Apr. 2, 2016 (Apr. 2, 2016), XP051080158, 4 pages, Retrieved from the Internet: URL:http://www.3gpp.org/ftp/tsg_ran/WG1_RL 1/TSGR1_84b/Docs/ [retrieved on Apr. 2, 2016].

Nokia et al: "On PCRS Design for NR", 3GPP Draft; R1-1610276, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 9, 016 (Oct. 9, 2016), XP051150293, Retrieved from the Internet: URL:http://www.3gpp.org/ftp/Meetings_3GPP SYNC/RAN1/Docs/ [retrieved on Oct. 9, 2016].

Nokia et al., "On Resource Block Grouping and Multi-Cell Coordination Aspects for Mixed Numerology Support", 3GPP Draft; R1-167261, 3rd Generation Partnership Project (3GPP), Mobile Competence Centre; 650, Route Des Lucioles ; F-06921 Sophia-Antipolis Cedex; France, vol. Ran WG1, No. Gothenburg, Sweden; Aug. 22, 2016-Aug. 26, 2016, Aug. 12, 2016 (Aug. 12, 2016), XP051132315, 10 Pages, Retrieved from the Internet: URL:http://www.3gpp.org/ftp/tsg_ran/WG1_RL_1/TSGR1_86/Docs/ [retrieved on Aug. 12, 2016].

Partial International Search Report—PCT/US2017/057006—ISA/EPO—dated Jan. 9, 2018.

International Search Report and Written Opinion—PCT/US2017/057006—ISA/EPO—dated Apr. 6, 2018.

\* cited by examiner

Different numerologies but same allocation

Different numerologies but partially overlapped allocation

MULTI-USER MULTIPLE INPUT MULTIPLE OUTPUT OPERATION WITH HETEROGENEOUS NUMEROLOGY SYSTEMS

CROSS-REFERENCE TO RELATED APPLICATIONS

The present application for patent claims priority to U.S. Provisional Application No. 62/411,199, filed Oct. 21, 2016, which is assigned to the assignee of the present application and hereby expressly incorporated by reference herein in its entirety.

BACKGROUND

Field of the Disclosure

Aspects of the present disclosure relate to wireless communications and, more particularly, to multi-user multiple input multiple output (MU-MIMO) techniques used by devices in heterogeneous numerology systems.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of Node Bs that can support communication for a number of user equipments (UEs). A UE may communicate with a Node B via the downlink and uplink. The downlink (or forward link) refers to the communication link from the Node B to the UE, and the uplink (or reverse link) refers to the communication link from the UE to the Node B.

These multiple access technologies have been adopted in various telecommunication standards to provide a common protocol that enables different wireless devices to communicate on a municipal, national, regional, and even global level. An example of an emerging telecommunication standard is new radio (NR, e.g., 5G radio access (RA)). NR is a set of enhancements to the LTE mobile standard promulgated by Third Generation Partnership Project (3GPP). NR is designed to better support mobile broadband Internet access by improving spectral efficiency, lowering costs, improving services, making use of new spectrum, and better integrate with other open standards using OFDMA with a cyclic prefix (CP) on the downlink (DL) and on the uplink (UL). In addition, NR supports beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques for transmitting, receiving, and processing multi-user multiple input multiple output (MU-MIMO) signals for heterogeneous numerology systems are described herein.

In an aspect of the present disclosure, a method for wireless communication is provided. The method may be performed, for example, by a scheduling entity (e.g., a base station). The method generally includes signaling an indication of numerology parameters to be used in transmitting first and second multi-user multiple input multiple output (MU-MIMO) signals to first and second user equipments (UEs) using shared resources and transmitting the first and second MU-MIMO signals to the first and second UEs, in accordance with the numerology parameters.

In an aspect of the present disclosure, a method for wireless communication is provided. The method may be performed, for example, by a UE. The method generally includes receiving an indication of numerology parameters to be used by a scheduling entity (e.g., a base station) when transmitting first and second multi-user multiple input multiple output (MU-MIMO) signals to at least the UE and another UE using shared resources and processing the first MU-MIMO signal, based on the numerology parameters.

In another aspect of the present disclosure, an apparatus for wireless communications is provided. The apparatus generally includes a processor configured to cause a transmitter to signal an indication of numerology parameters to be used in transmitting first and second multi-user multiple input multiple output (MU-MIMO) signals to first and second user equipments (UEs) using shared resources and cause the transmitter to transmit the first and second MU-MIMO signals to the first and second UEs, in accordance with the numerology parameters, and a memory coupled with the processor.

In yet another aspect of the present disclosure, an apparatus for wireless communications is provided. The apparatus generally includes a processor configured to obtain from a receiver an indication of numerology parameters to be used by a scheduling entity when transmitting first and second multi-user multiple input multiple output (MU-MIMO) signals to at least a user equipment comprising the apparatus and another UE using shared resources and process the first MU-MIMO signal, based on the numerology parameters, and a memory coupled with the processor.

In still another aspect of the present disclosure, an apparatus for wireless communications by a scheduling entity is provided. The apparatus generally includes means for signaling an indication of numerology parameters to be used in transmitting first and second multi-user multiple input multiple output (MU-MIMO) signals to first and second user equipments (UEs) using shared resources and means for transmitting the first and second MU-MIMO signals to the first and second UEs, in accordance with the numerology parameters.

In yet another aspect of the present disclosure, an apparatus for wireless communications by a user equipment (UE) is provided. The apparatus generally includes means for receiving an indication of numerology parameters to be used by a scheduling entity when transmitting first and second multi-user multiple input multiple output (MU-MIMO) signals to at least the UE and another UE using shared resources and means for processing the first MU-MIMO signal, based on the numerology parameters.

Aspects of the present disclosure also provide various apparatus, means, and computer readable medium having instructions for performing the operations described above.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
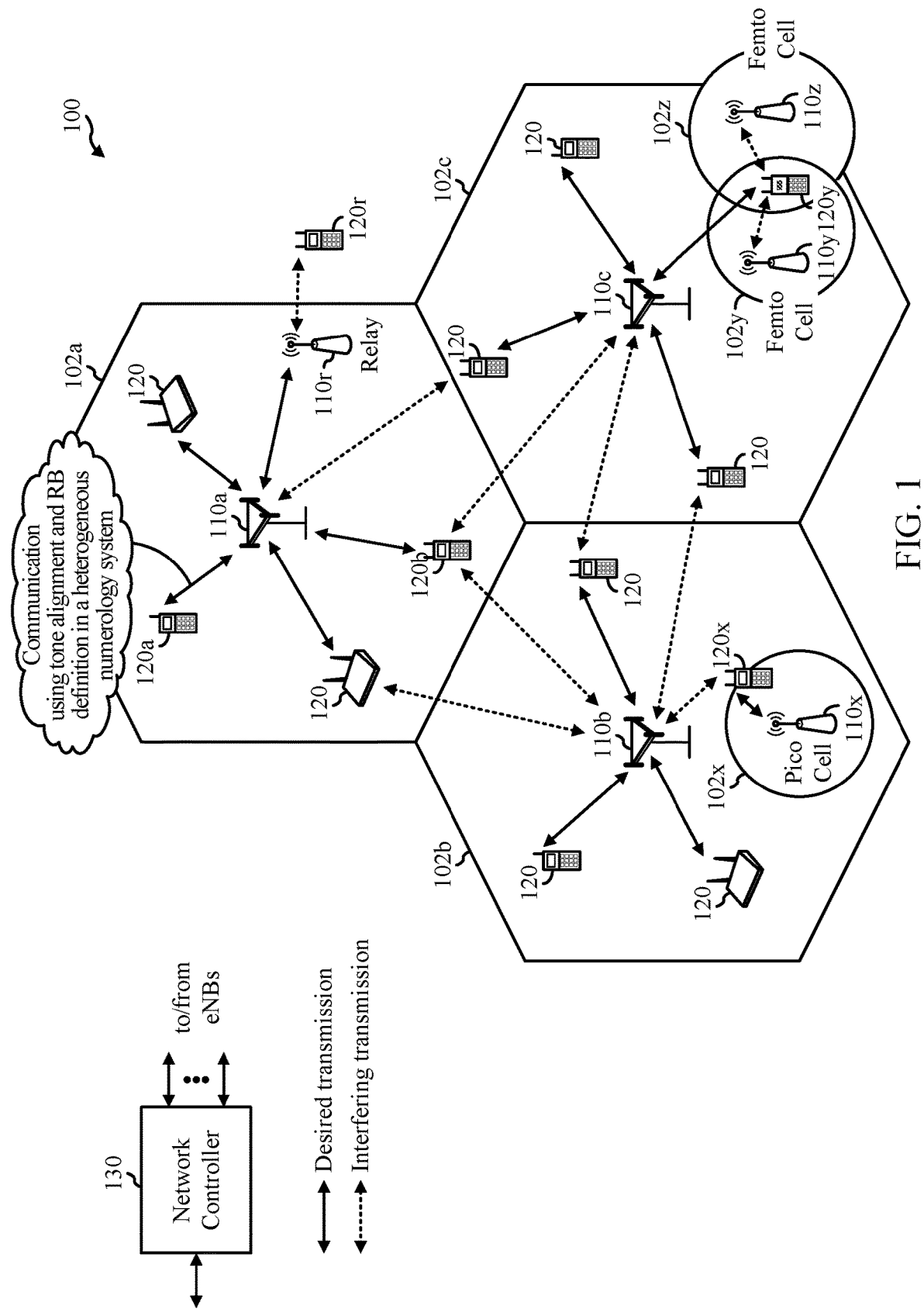
FIG. 1 is a block diagram conceptually illustrating an example telecommunications system, according to aspects of the present disclosure.

Aspects of the present disclosure provide apparatus, methods, processing systems, and computer readable mediums for communicating using tones and RB in a systems with heterogeneous numerologies. Heterogeneous numerology may refer to wireless communication systems in which UEs may be asynchronous, have different tone spacing, and/or have different cyclic prefix lengths.

In multi-user multiple input multiple output (MU-MIMO) operations, a transmitter may simultaneously transmit multiple signals to multiple receivers. The multiple signals may be transmitted via multiple antennas. Each receiver may receive and process the multiple signals and to extract a signal intended for that receiver (e.g., a desired signal). Information regarding signals that are not intended for a receiver (e.g., undesired signals) may be used by the receiver in processing the signals and extracting a desired signal. In communications systems using heterogeneous numerologies, transmitting signals using various numerologies with MU-MIMO may cause interference between the signals to vary over time. Information regarding various numerologies used in transmitting MU-MIMO signals may be used by receivers in processing the MU-MIMO signals.

Aspects of the present disclosure provide techniques for signaling indications of transmission parameters of MU-MIMO transmissions to receivers. Receivers receiving the indications may use information regarding transmission parameters of MU-MIMO transmissions to process the MU-MIMO transmissions, for example, to extract a desired signal from a set of MU-MIMO transmissions transmitted during a period that do not all use a same numerology.

For example, a BS may transmit a MU-MIMO signal comprising a first signal intended for a first UE and a second signal intended for a second UE. The BS may transmit the first signal using a first numerology and the BS may transmit the second signal using a second numerology. According to aspects, each of the first and second UEs may be configured to communicate via one or more numerologies.

As described herein, a numerology may be based, at least in part, on a subcarrier or tone spacing, a shift in frequency, and/or cyclic prefix (CP). Accordingly, a BS and UE, in heterogeneous numerology system may communicate using tones determined based on a numerology. Additionally or alternatively, the BS and UE may communicate using an RB defined using a numerology.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

For clarity, while aspects may be described herein using terminology commonly associated with 3G and/or 4G wireless technologies, aspects of the present disclosure can be applied in other generation-based communication systems, such as 5G and later, including NR technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) techniques targeting wide bandwidth (e.g. 80 MHz and beyond) communications, millimeter wave (mmW) techniques targeting high carrier frequency (e.g. 27 GHz or higher) communications, massive machine type communications (mMTC) techniques targeting non-backward compatible MTC communications, and mission critical techniques targeting ultra reliable low latency communications (URLLC). For these general topics, different techniques are considered, such as coding, low-density parity check (LDPC), and polar. NR cell may refer to a cell operating according to the new air interface or fixed transport layer. A NR Node B (e.g., 5G Node B) may correspond to one or multiple transmission reception points (TRPs).

NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. TRPs may transmit downlink signals to UEs indicating the cell type. Based on the cell type indication, the UE may communicate with the TRP. For example, the UE may determine TRPs to consider for cell selection, access, handover, and/or measurement based on the indicated cell type.

In some cases, the UE can receive measurement configuration from the RAN. The measurement configuration information may indicate ACells or DCells for the UE to measure. The UE may monitor/detect measurement reference signals from the cells based on measurement configuration information. In some cases, the UE may blindly detect MRS. In some cases the UE may detect MRS based on MRS-IDs indicated from the RAN. The UE may report the measurement results.

Example Wireless Communications System

FIG. 1 illustrates an example wireless network 100 in which aspects of the present disclosure may be performed. For example, the wireless network may be a new radio (NR) or 5G network.

According to aspects of the present disclosure, the wireless network 100 may be a heterogeneous numerology system, wherein UEs 120 within the network 100 may be asynchronous, have different intercarrier spacing, and/or have different cyclic prefix lengths. According to aspects of the present disclosure, a BS, such as BS 110a, may support different services having different service requirements. For example, the BS 110a may support communications with UEs using different subcarrier spacings. The BS 110a may communicate with UE 120a using a first subcarrier spacing and may communicate with UE 120b using a second subcarrier spacing. UEs 120a, 120b may be configured to operate according to one or more numerologies. In this manner a network may support communications with different subcarrier spacings.

According to aspects of the present disclosure, the subcarrier spacing associated with the different service requirements may be scaled. As a non-limiting example, for illustrative purposes only, the subcarrier spacing may be 15 kHz, 30 kHz, 60 kHz, 120 kHz, and so on (e.g., x1, x2, x4, x8, and so on . . . ). According to another example, the subcarrier spacing may be 17.5 kHz, 35 kHz, and so on (e.g., x1, x2, x3, x4, and so on). Aspects described herein provide methods for tone allocation and resource block definition for heterogeneous numerology systems, which may be beneficial for scheduling devices and communicating with one or more devices in heterogeneous numerology systems.

As described herein, a numerology may be based, at least in part, on a subcarrier spacing and a shift in frequency. The BS 110a and UE 120a may communicate using tones determined using a numerology. Additionally or alternatively, the BS 110a and 120a may communicate using one or more resource blocks (RBs) defined using a numerology.

The BS 110 may be configured to perform the operations 1100, and the UE 120 (e.g., UE 120a) may be configured to perform the operations 1200. Furthermore, the BS 110a and the UE 120a may be configured to perform other aspects described herein. The BS may comprise a transmission reception point (TRP).

The system illustrated in FIG. 1 may be, for example, a long term evolution (LTE) network. The wireless network 100 may include a number of Node Bs (e.g., eNodeBs, eNBs, 5G Node Bs, next generation nodeBs) 110 and other network entities. A Node B may be a station that communicates with the UEs and may also be referred to as a base station, an access point, a 5G Node B, or a next generation NodeB (gNB).

Each Node B 110 may provide communication coverage for a particular geographic area. In 3GPP, the term "cell" can refer to a coverage area of a Node B and/or a Node B subsystem serving this coverage area, depending on the context in which the term is used.

A Node B may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A Node B for a macro cell may be referred to as a macro Node B. A Node B for a pico cell may be referred to as a pico Node B. A Node B for a femto cell may be referred to as a femto Node B or a home Node B. In the example shown in FIG. 1, the Node Bs 110a, 110b and 110c may be macro Node Bs for the macro cells 102a, 102b and 102c, respectively. The Node B 110x may be a pico Node B for a pico cell 102x. The Node Bs 110y and 110z may be femto Node Bs for the femto cells 102y and 102z, respectively. A Node B may support one or multiple (e.g., three) cells.

The wireless network 100 may also include relay stations. A relay station is a station that receives a transmission of data and/or other information from an upstream station (e.g., a Node B or a UE) and sends a transmission of the data and/or other information to a downstream station (e.g., a UE or a Node B). A relay station may also be a UE that relays transmissions for other UEs. In the example shown in FIG. 1, a relay station 110r may communicate with the Node B 110a and a UE 120r in order to facilitate communication between the Node B 110a and the UE 120r. A relay station may also be referred to as a relay Node B, a relay, etc.

The wireless network 100 may be a heterogeneous network that includes Node Bs of different types, e.g., macro Node Bs, pico Node Bs, femto Node Bs, relays, transmission reception points (TRPs), etc. These different types of Node Bs may have different transmit power levels, different coverage areas, and different impact on interference in the wireless network 100. For example, macro Node Bs may have a high transmit power level (e.g., 20 Watts) whereas pico Node Bs, femto Node Bs and relays may have a lower transmit power level (e.g., 1 Watt).

The wireless network 100 may support synchronous or asynchronous operation. For synchronous operation, the Node Bs may have similar frame timing, and transmissions from different Node Bs may be approximately aligned in time. For asynchronous operation, the Node Bs may have different frame timing, and transmissions from different Node Bs may not be aligned in time. The techniques described herein may be used for both synchronous and asynchronous operation.

A network controller 130 may couple to a set of Node Bs and provide coordination and control for these Node Bs. The network controller 130 may communicate with the Node Bs 110 via a backhaul. The Node Bs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro Node Bs, pico Node Bs, femto Node Bs, relays, etc. In FIG. 1, a solid line with double arrows indicates desired transmissions between a UE and a serving Node B, which is a Node B designated to serve the UE on the downlink and/or uplink. A dashed line with double arrows indicates interfering transmissions between a UE and a Node B.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively. New radio (NR) may use a different air interface, other than OFDM-based. NR networks may include entities such as central units (CUs) or distributed units (DUs).

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of the frame being 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a CU or DU) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
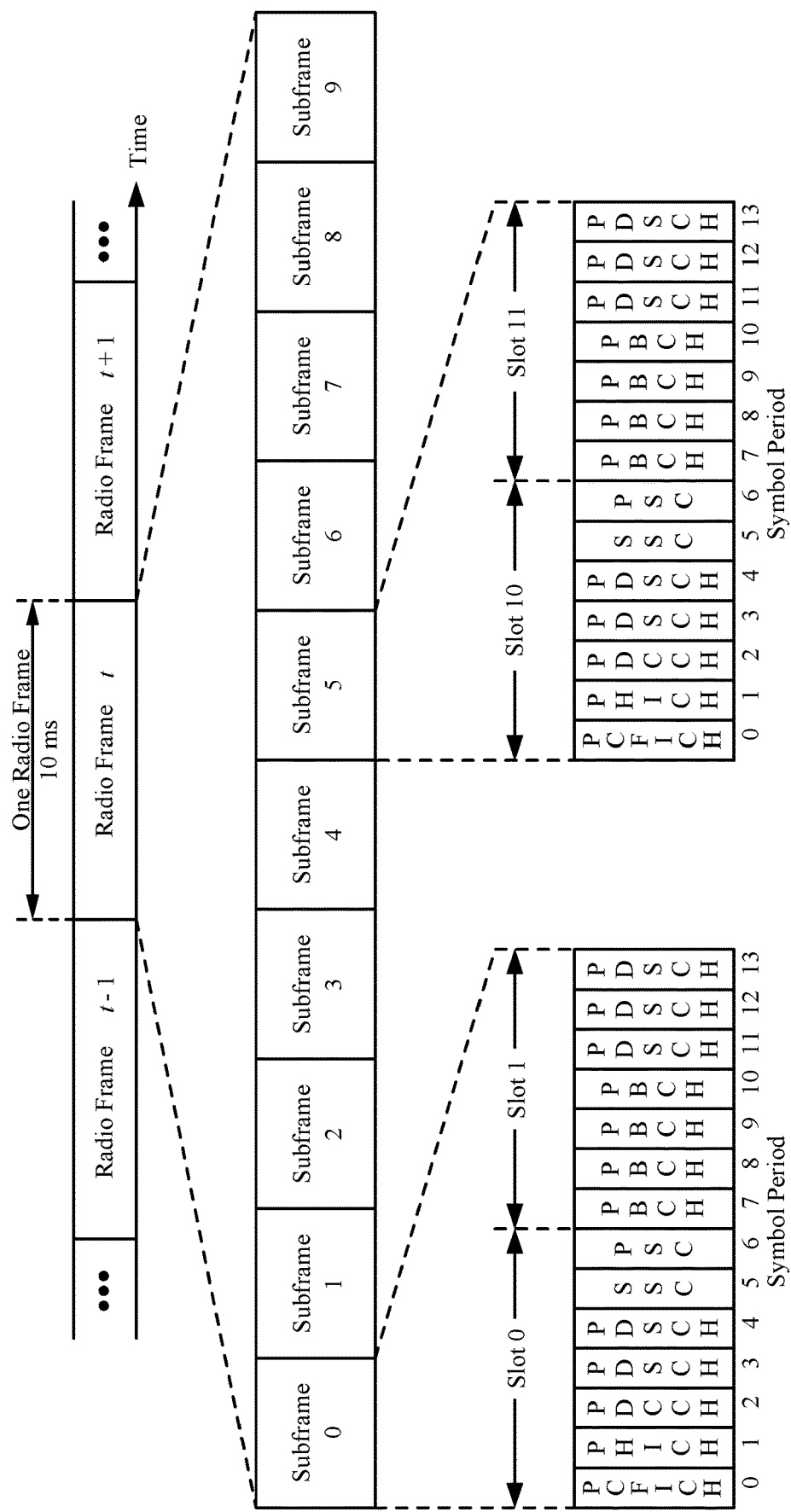
FIG. 2 is a block diagram conceptually illustrating an example downlink frame structure in a telecommunications system, according to aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each sub-frame may be assigned indices of 0 through 2L-1. The available time frequency resources may be partitioned into resource blocks. Each resource block may cover N subcarriers (e.g., 12 subcarriers) in one slot.

In LTE, a Node B may send a primary synchronization signal (PSS) and a secondary synchronization signal (SSS) for each cell in the Node B. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The Node B may send a Physical Broadcast Channel (PBCH) in symbol periods 0 to 3 in slot 1 of sub-frame 0. The PBCH may carry certain system information.

The Node B may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The Node B may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The Node B may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The Node B may send the PSS, SSS and PBCH in the center 1.08 MHz of the system bandwidth used by the Node B. The Node B may send the PCFICH and PHICH across the entire system bandwidth in each symbol period in which these channels are sent. The Node B may send the PDCCH to groups of UEs in certain portions of the system bandwidth. The Node B may send the PDSCH to specific UEs in specific portions of the system bandwidth. The Node B may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A Node B may send the PDCCH to the UE in any of the combinations that the UE will search.

A UE may be within the coverage of multiple Node Bs. One of these Node Bs may be selected to serve the UE. The serving Node B may be selected based on various criteria such as received power, path loss, signal-to-noise ratio (SNR), etc.

Figure 3:
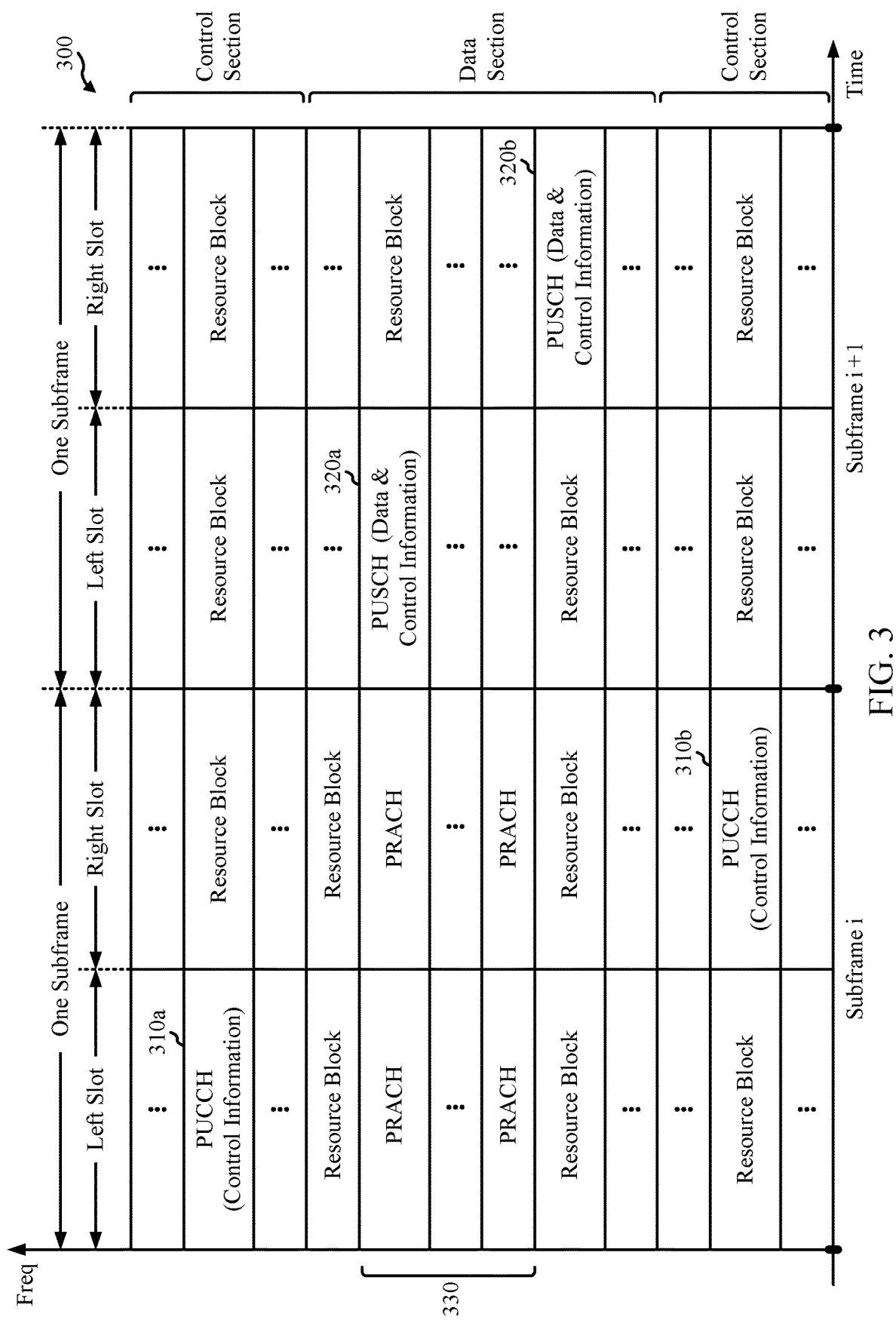
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b in the control section to transmit control information to a Node B. The UE may also be assigned resource blocks 320a, 320b in the data section to transmit data to the Node B. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
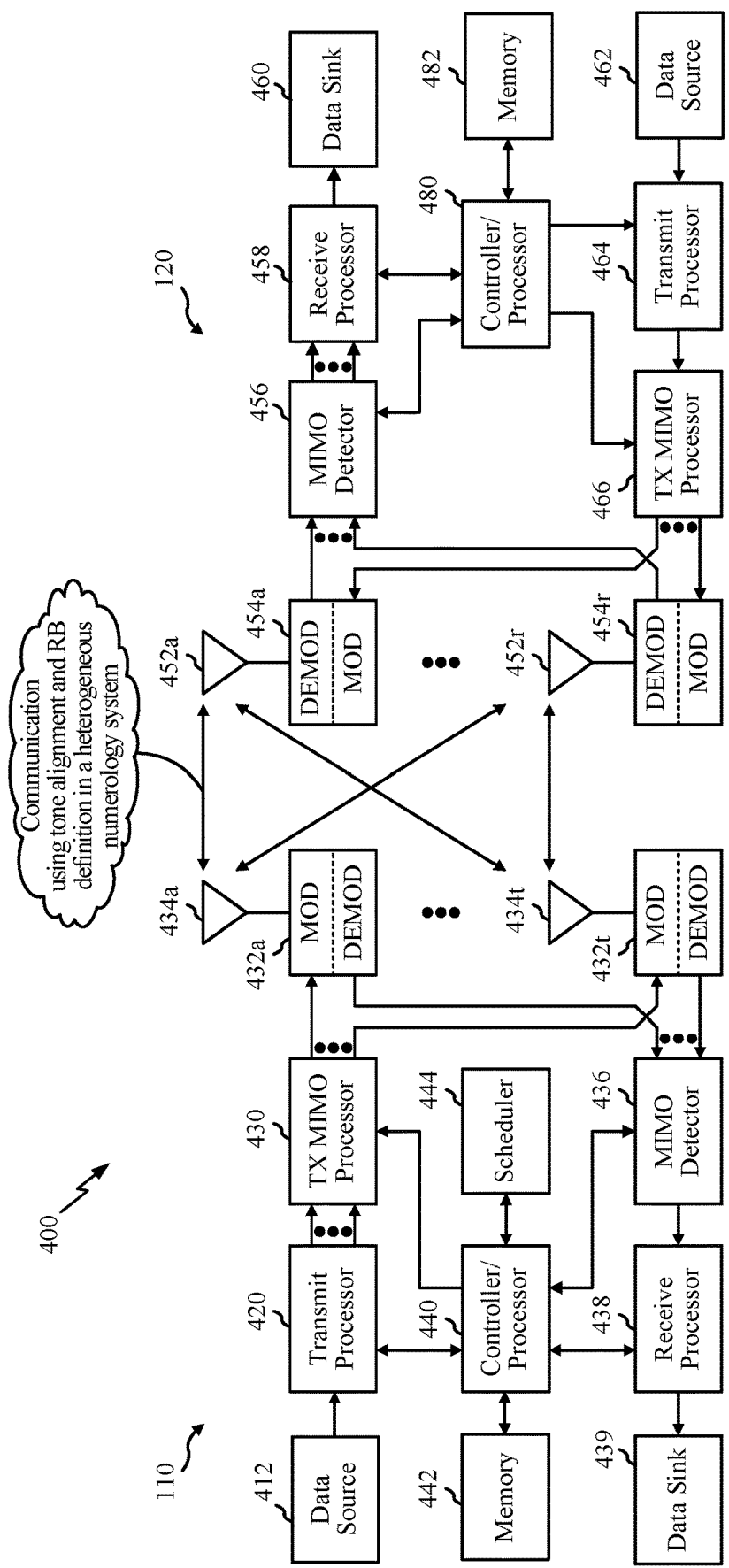
FIG. 4 is a block diagram conceptually illustrating a design of an example Node B and user equipment (UE), according to aspects of the present disclosure.

FIG. 4 illustrates example components of the base station 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 18-21. The BS 110 may comprise a TRP. As illustrated, the BS/TRP 110 and UE 120 may communicate using tone alignment and/or RB definition in a heterogeneous numerology system.

FIG. 4 shows a block diagram of a design of a base station/Node B/TRP 110 and a UE 120, which may be one of the base stations/Node Bs/TRPs and one of the UEs in FIG. 1. For a restricted association scenario, the base station 110 may be the macro Node B 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of various processes for the techniques described herein. The processor 480 and/or other processors and modules at the UE 120 may also perform or direct, e.g., the execution of the functional blocks illustrated in FIGS. 18-21, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
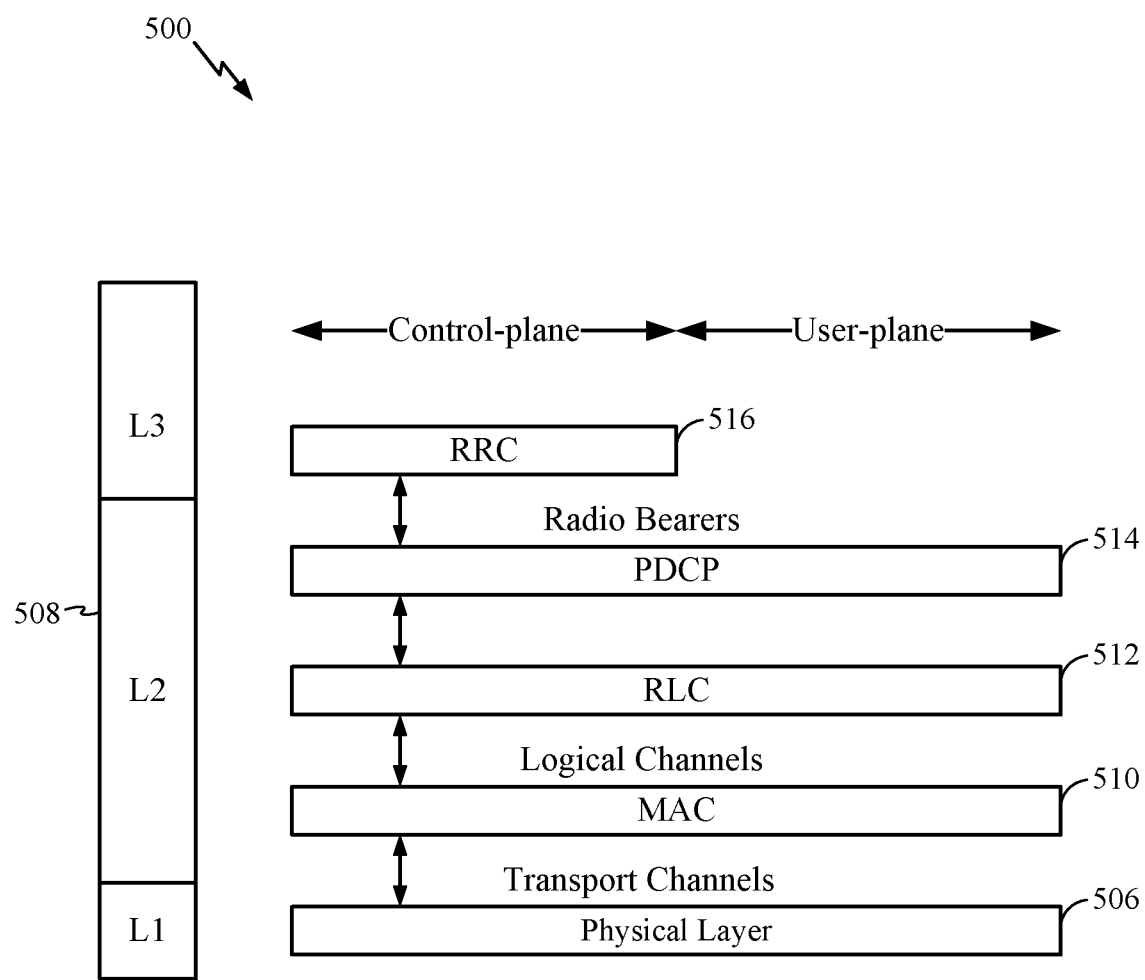
FIG. 5 is a diagram illustrating an example radio protocol architecture for the user and control planes, according to aspects of the present disclosure.

FIG. 5 is a diagram 500 illustrating an example of a radio protocol architecture for the user and control planes in LTE. The radio protocol architecture for the UE and the Node B is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and Node B over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the Node B on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between Node Bs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and Node B is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the Node B and the UE.

Figure 6:
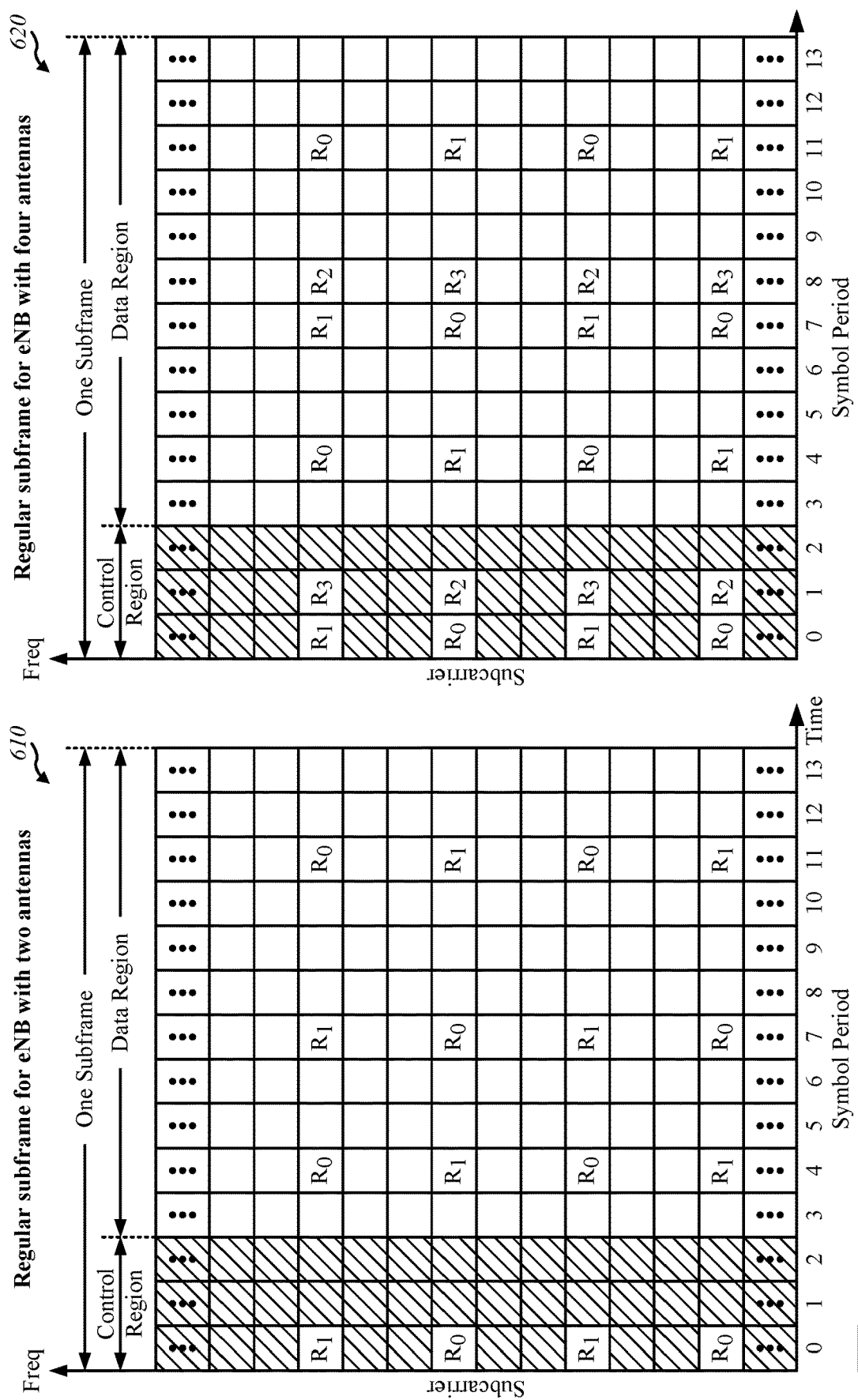
FIG. 6 illustrates an example subframe resource element mapping, according to aspects of the present disclosure.

FIG. 6 shows two exemplary subframe formats 610 and 620 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 610 may be used for a Node B equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 6, for a given resource element with label $R_a$, a modulation symbol may be transmitted on that resource element from antenna a, and no modulation symbols may be transmitted on that resource element from other antennas. Subframe format 620 may be used for a Node B equipped with four antennas. A CRS may be transmitted from antennas 0 and 1 in symbol periods 0, 4, 7 and 11 and from antennas 2 and 3 in symbol periods 1 and 8. For both subframe formats 610 and 620, a CRS may be transmitted on evenly spaced subcarriers, which may be determined based on cell ID. Different Node Bs may transmit their CRSs on the same or different subcarriers, depending on their cell IDs. For both subframe formats 610 and 620, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., a Node B) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple Node Bs. One of these Node Bs may be selected to serve the UE. The serving Node B may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering Node Bs.

New radio (NR) may refer to radios configured to operate according a wireless standard, such as 5G (e.g. wireless network 100). NR may include Enhanced mobile broadband (eMBB) techniques targeting wide bandwidth (e.g. 80 MHz and beyond) communications, millimeter wave (mmW) techniques targeting high carrier frequency (e.g. 27 GHz and higher) communications, massive machine type communications (mMTC) targeting non-backward compatible machine type communications (MTC) techniques, and mission critical techniques targeting ultra reliable low latency communications (URLLC).

NR cell may refer to a cell operating according in the NR network. A NR Node B (e.g., Node B 110) may correspond to one or multiple transmission reception points (TRPs). As used herein, a cell may refer to a combination of downlink (and potentially also uplink) resources. The linking between the carrier frequency of the downlink resources and the carrier frequency of the uplink resources is indicated in the system information (SI) transmitted on the downlink resources. For example, system information can be transmitted in a physical broadcast channel (PBCH) carrying a master information block (MIB).

NR RAN architecture may include a central unit (CU) (e.g., network controller 130). The CU may be an Access node controller (ANC). The CU terminates backhaul interface to RAN-CN, terminates backhaul interface to neighbor RAN node. The RAN may include a Distributed unit that may be one or more TRPs that may be connected to one or more ANCs (not shown). TRPs may advertise System Information (e.g., Global TRP ID), may include PDCP/RLC/MAC functions, may comprise one or more antenna ports, may be configured to individually (dynamic selection) or jointly (joint transmission), and may serve traffic to the UE.

Heterogeneous numerology wireless communication systems may refer to systems in which UEs may be asynchronous, have different intercarrier spacing and/or have different cyclic prefix lengths. According to aspects of the present disclosure, tones for different numerologies may be aligned. A numerology may be based on a subcarrier spacing and a tone shift. As described herein, regardless of the numerology, the tones from the heterogeneous numerology wireless systems may be frequency-aligned.

Figure 7:
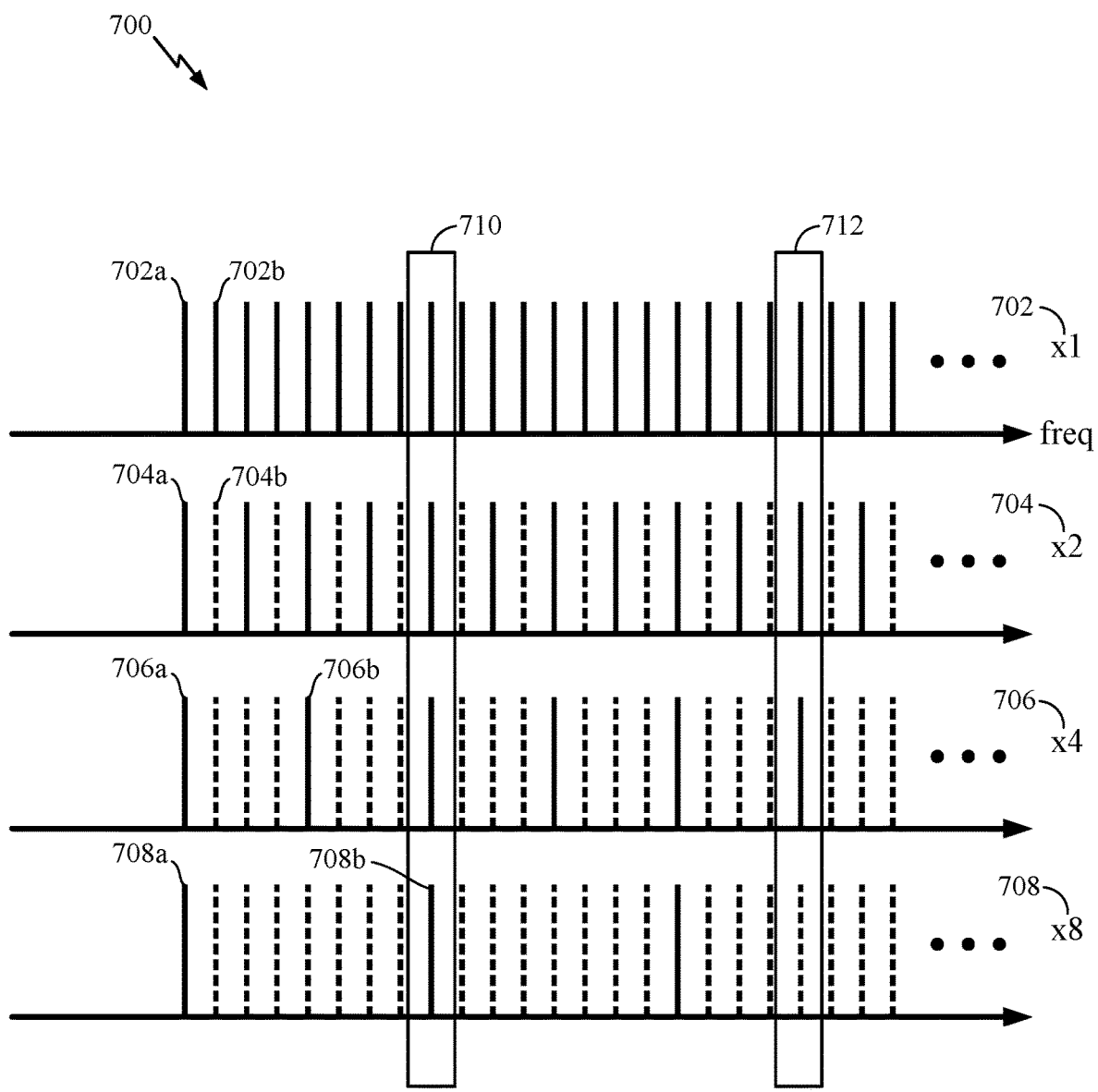
FIG. 7 illustrates an example tone alignment, according to aspects of the present disclosure.

FIG. 7 illustrates an example 700 of tone alignment, according to aspects of the present disclosure. 702 illustrates an example of a x1 subcarrier or tone spacing, 704 illustrates an example of a x2 subcarrier or tone spacing, 706 illustrates an example of a x4 subcarrier or tone spacing, and 708 illustrates an example of a x8 subcarrier or tone spacing. As illustrated, the tone spacings 702-708 are scaled. In other words, the smallest tone spacing may be x1, which may refer to, for example, a subcarrier or tone spacing of 15 kHz. The next tone spacing may be x2, which may refer to a tone spacing of 30 kHz. A tone spacing of x4 may refer to a tone spacing of 60 kHz, and a tone spacing of x8 may refer to a tone spacing of 120 kHz. While not illustrated, aspects of the present disclosure may also include a tone spacing of x16 and so on.

702 provides a tone alignment for the smallest illustrated subcarrier spacing (x1). As shown by 702a and 702b, every tone is used. At 704, for the x2 subcarrier spacing, every other tone may be used, as shown at 704a and 704b. At 706, for the x4 subcarrier spacing, every fourth tone may be used, as shown at 706a and 706b. At 708, for the x8 subcarrier spacing, every eight tone may be used, as shown at 708a and 708b.

In this manner, for different subcarrier spacings, tones may be aligned on a frequency grid, as shown, for example, at 710. Thus, for scaled subcarrier spacings, tones available for use by a subcarrier spacing may be available for use for all subcarrier spacings associated with a smaller subcarrier spacing. In other words, a tone available for an x8 subcarrier spacing may also be available for subcarrier spacings of x1, x2, and x4, which are all associated with a smaller subcarrier spacing than the x8. Similarly, a tone available for use by an x4 subcarrier spacing may be available for an x2 and x1 subcarrier spacings, as shown at 712.

Example MU-MIMO Operation with Heterogeneous Numerology

According to aspects of the present disclosure, different UEs may be scheduled to use different numerologies (e.g., receiving signals transmitted with differing cyclic prefix (CP) length and/or differing tone spacing) when receiving MU-MIMO signals transmitted on a set of shared transmission resources (e.g., a set of RBs, a set of frequencies in a subframe). In some cases, starting points of data transmissions (e.g., PDSCHs) transmitted may be different for UEs receiving on the same resources or some of the same resources. Similarly, in some cases transmission duration for a scheduled transmission, such as a PDSCH, may be different for transmissions to two UEs sharing some transmission resources. Differences in the numerology, starting points of data transmission, and duration of data transmissions may impact UE channel estimation and/or noise estimation, depending on whether UE is aware of information regarding such differences.

According to aspects of the present disclosure, one or more indications of numerology parameters (e.g., tone spacing, (CP) length, data transmission starting symbol, transmission duration) to be used, by a base station (BS), in transmitting MU-MIMO signals to UEs may be signaled to the UEs. The BS may transmit the MU-MIMO signals in accordance with the numerology parameters and the UEs may process the MU-MIMO signals based on the numerology parameters. The UEs may use the numerology parameters in estimating interference and/or channels (e.g., channel state information (CSI)) and use the estimated interference and/or channel estimates in extracting desired signals from the MU-MIMO signals.

Figure 8A:
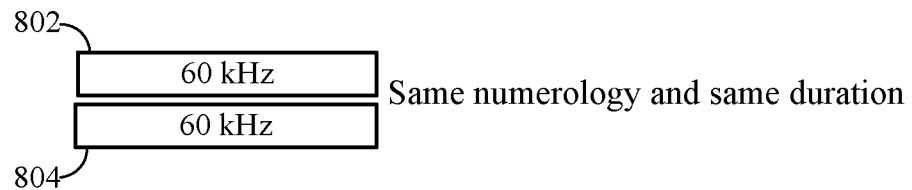
FIGS. 8A-8D illustrate time domain views of examples of allocations to UEs, according to aspects of the present disclosure.
Figure 8B:
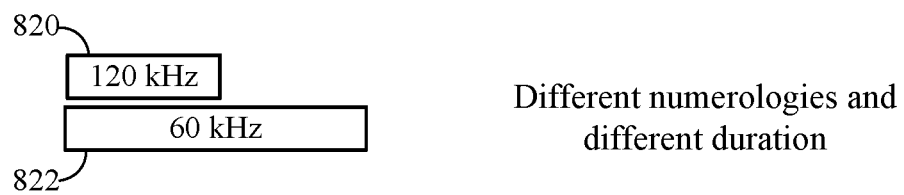
Figure 8C:
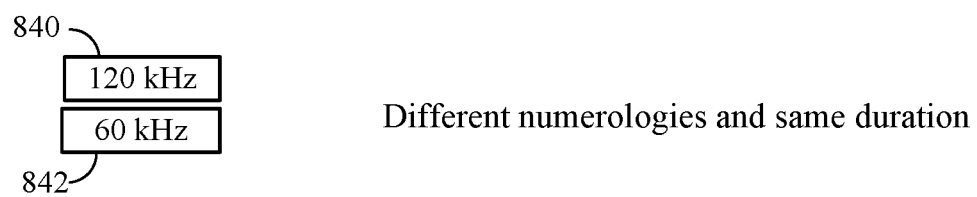
Figure 8D:
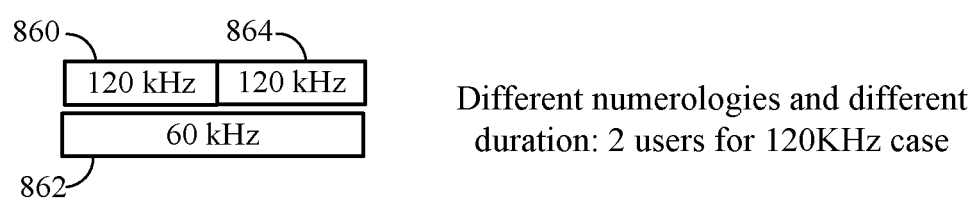

FIGS. 8A-8D illustrate time domain views of examples of allocations to UEs, such as UEs 120 shown in FIG. 1, with various numerologies on shared transmission resources, according to aspects of the present disclosure. FIG. 8A illustrates allocations 802, 804 to two UEs on the same transmission resources, with each UE using a same numerology based on a tone spacing, $f_k$ (e.g., 60 kHz), during a time slot of duration $T_s$ (e.g., one millisecond). FIG. 8B illustrates allocations to two UEs on overlapping transmission resources, with an allocation 820 to a first UE using a numerology based on a $S_f f_k$ tone spacing with $S_f \neq 1$ (e.g., a 120 kHz tone spacing when $S_f=2$ and $f_k=60$ kHz) and having a shorter duration, $T_s/S_t$, with $S_t \neq 1$, than an allocation 822 to a second UE using a numerology based on a $f_k$ (e.g., 60 kHz) tone spacing during a time slot of duration, $T_s$. FIG. 8C illustrates an allocation 840 to a first UE using a numerology based on a $S_f f_k$ tone spacing with $S_f \neq 1$ (e.g., a 120 kHz tone spacing when $S_f=2$ and $f_k=60$ kHz) and an allocation 842 to a second UE using an $f_k$ (e.g., 60 kHz) tone spacing. FIG. 8D illustrates an allocation 860 to a first UE using a $S_f f_k$ tone spacing with $S_f \neq 1$ (e.g., a 120 kHz tone spacing when $S_f=2$ and $f_k=60$ kHz), an allocation 862 to a second UE using a $f_k$ (e.g., 60 kHz) tone spacing, and an allocation 864 to a third UE using a $S_f f_k$ tone spacing with $S_f \neq 1$ (e.g., a 120 kHz tone spacing when $S_f=2$ and $f_k=60$ kHz), where the allocations 860 and 864 to the first and third UEs do not overlap in time, but both overlap in time with the allocation 862 to the second UE. While each of FIGS. 8A-8D refer to examples of numerologies using either 60 kHz tone spacing or 120 kHz tone spacing, the present disclosure is not so limited, and aspects of the present disclosure may be practiced with numerologies of other tone spacings (e.g., 15 kHz, 30 kHz, 240 kHz), as well as numerologies using differing CP lengths.

According to aspects of the present disclosure, a BS allocating transmission resources according to any of the allocations shown in FIGS. 8A-8D may signal (e.g., transmit) an indication of numerology parameters of transmissions (e.g., MU-MIMO transmissions) to be transmitted using the allocated transmission resources and then transmit the transmissions, using the allocated transmission resources.

According to aspects of the present disclosure, a UE receiving transmissions on any of the allocations shown in FIGS. 8A-8D may receive (e.g., from a serving BS) an indication of numerology parameters of a transmission (e.g., a MU-MIMO transmissions) to be received using the allocated transmission resources and then process the transmission, based on the numerology parameters.

Figure 9A:
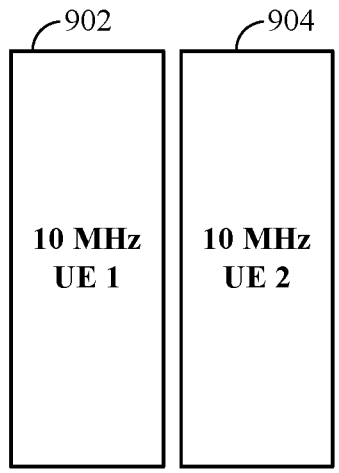
FIGS. 9A-9B illustrate frequency domain views of examples of allocations to UEs, according to aspects of the present disclosure.
Figure 9B:
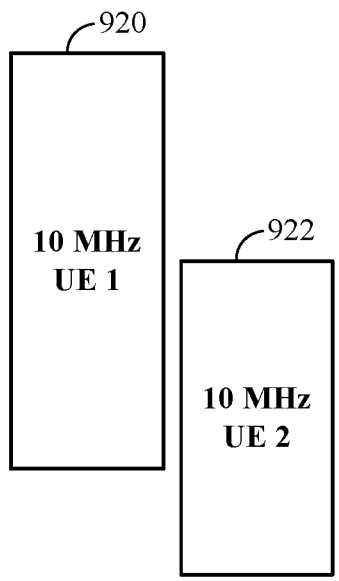

FIGS. 9A-9B illustrate frequency domain views of examples of allocations to UEs, such as UEs 120 shown in FIG. 1, with various numerologies on shared transmission resources, according to aspects of the present disclosure. FIG. 9A illustrates allocations 902, 904 to two UEs on the same transmission resources, with each UE using a different numerology. FIG. 9B illustrates an allocation 920 to a first UE using a first numerology (e.g., based on a 120 kHz tone spacing) and a second allocation 922 to a second UE using a second numerology (e.g., based on a 60 kHz tone spacing), where the allocations 920 and 922 to the two UEs are on transmission resources that overlap in frequency. For example, allocation 920 may be on a 10 MHz block from 910 MHz to 920 MHz while allocation 922 may be on a 10 MHz block from 905 MHz to 915 MHz.

Figure 10:
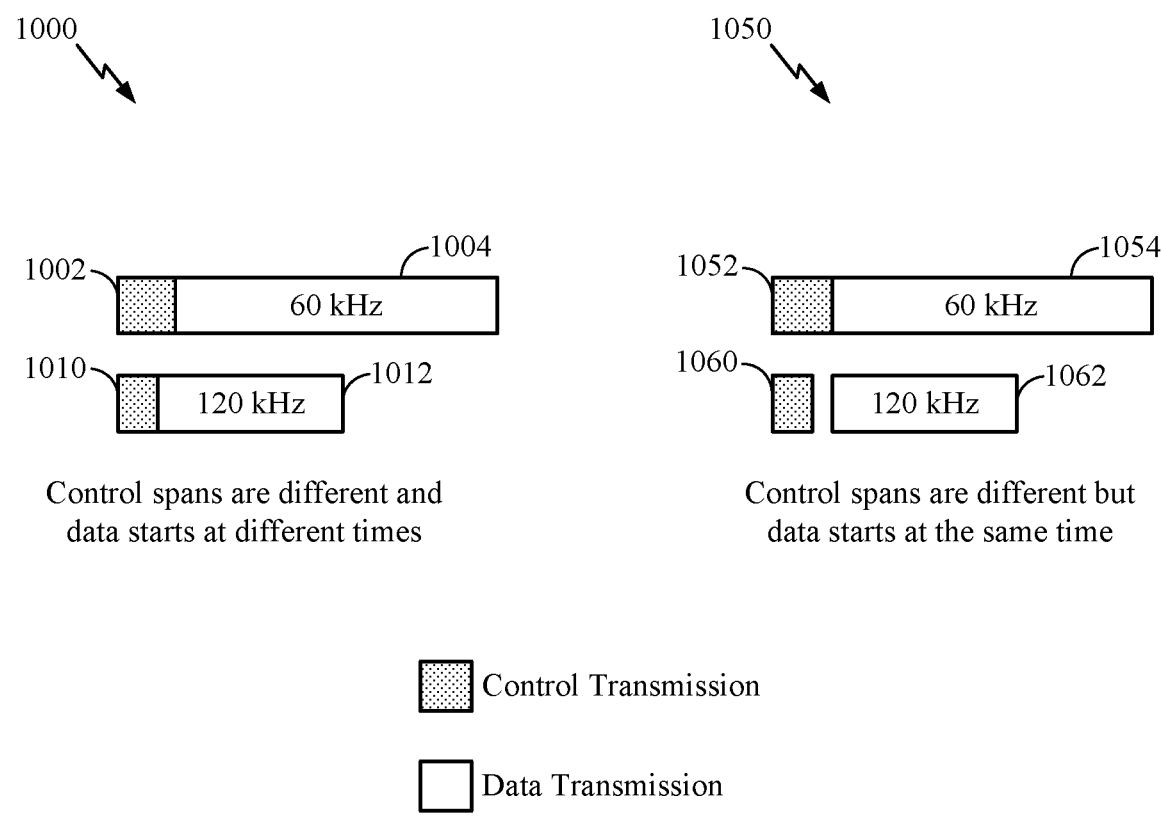
FIG. 10 illustrates time domain views of examples of allocations to UEs, according to aspects of the present disclosure.

FIG. 10 illustrates time domain views of examples 1000 and 1050 of allocations to UEs, such as UEs 120 shown in FIG. 1, with various numerologies on shared transmission resources, according to aspects of the present disclosure. The allocations shown at 1000 include an allocation for a control transmission 1002 and a data transmission 1004 (using a numerology based on a 60 kHz tone spacing) to a first UE and an allocation for a control transmission 1010 and a data transmission 1012 (using a numerology based on a 120 kHz tone spacing) to a second UE. As illustrated, the durations of the control transmissions 1002 and 1010 differ, and the respective data transmissions 1004 and 1012 start at different times (e.g., different symbol indices, with reference to FIG. 6). The allocations shown at 1050 include an allocation for a control transmission 1052 and a data transmission 1054 (using a numerology based on a 60 kHz tone spacing) to a first UE and an allocation for a control transmission 1060 and a data transmission 1062 (using a numerology based on a 120 kHz tone spacing) to a second UE. As illustrated, the durations of the control transmissions 1052 and 1060 differ, but the respective data transmissions 1054 and 1062 start at the same time (e.g., a same symbol index, with reference to FIG. 6).

Figure 11:
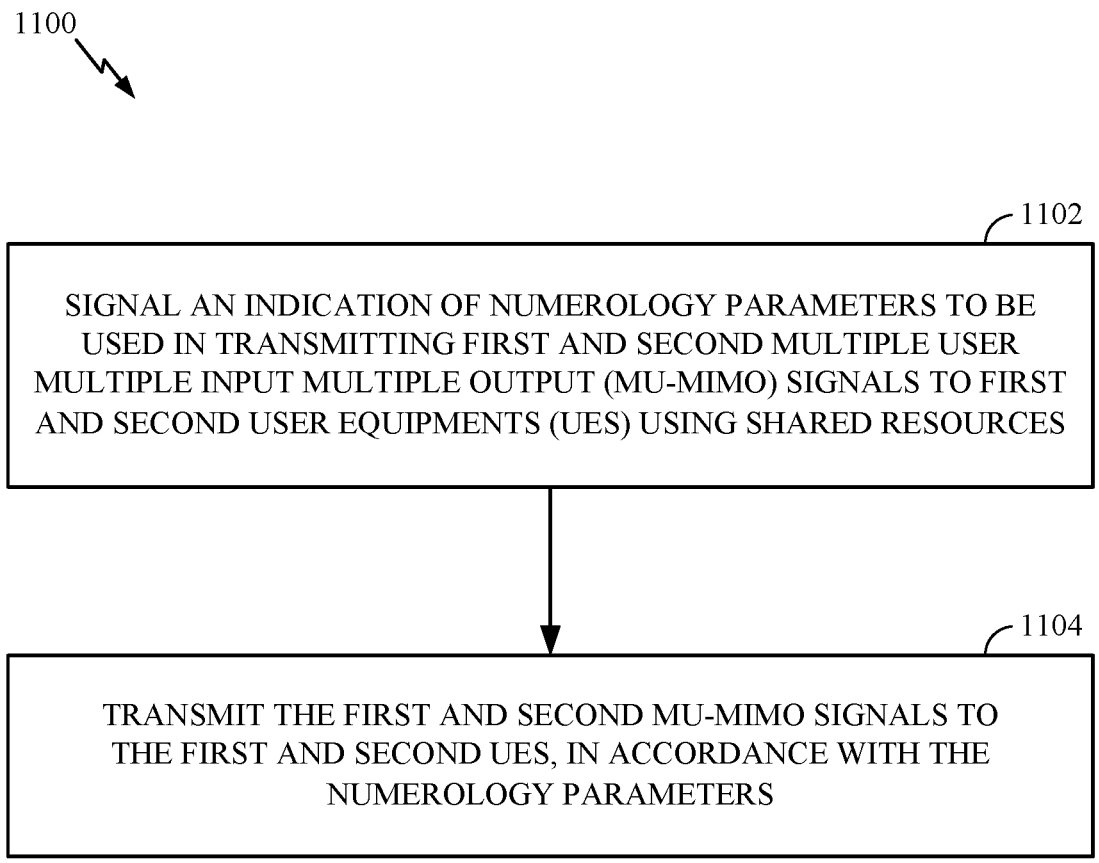
FIG. 11 illustrates example operations that may be performed by a BS, according to aspects of the present disclosure.

FIG. 11 illustrates example operations 1100 that may be performed by a scheduling entity, according to aspects of the present disclosure. The scheduling entity may be, for example, BS 110a in FIG. 1, which may include one or more components illustrated in FIG. 4. In some aspects of the present disclosure, the scheduling entity may be a UE in a peer-to-peer network, as mentioned previously.

Operations 1100 begin at block 1102 with the scheduling entity signaling an indication of numerology parameters to be used in transmitting first and second multi-user multiple input multiple output (MU-MIMO) signals to first and second user equipments (UEs) using shared resources. For example, BS 110a, shown in FIG. 1, may signal an indication (e.g., via RRC signaling) that a first MU-MIMO signal to UE 120a will use a numerology based on 15 kHz tone-spacing and that a second MU-MIMO signal to UE 120b will use a numerology based on 30 kHz tone-spacing.

At block 1104, the scheduling entity transmits the first and second MU-MIMO signals to the first and second UEs, in accordance with the numerology parameters. Continuing the example from above, the BS 110a may transmit the first MU-MIMO signal to UE 120a using the numerology based on 15 kHz tone-spacing and the second MU-MIMO signal to UE 120b using the numerology based on 30 kHz tone-spacing during a first period, similarly to the transmissions illustrated in FIGS. 8B, 8C, and 8D.

According to aspects of the present disclosure, the scheduling entity may transmit the indication using a control channel, a medium access control (MAC) control element (MAC-CE) and/or higher layer signaling (e.g., RRC signaling) to indicate one or more numerology parameters for transmissions sharing at least some transmission resources (e.g., time and frequency resources).

In aspects of the present disclosure, the scheduling entity may indicate whether a same numerology is used for the first and second MU-MIMO signals. That is, the indication from the scheduling entity in block 1102 may indicate a numerology and multiple UEs to which the scheduling entity may send MU-MIMO transmissions using the indicated numerology.

According to aspects of the present disclosure, the scheduling entity may indicate whether data portions of the MU-MIMO signals start at a same symbol when those MU-MIMO signals use different numerologies (see, e.g., FIG. 10). That is, the scheduling entity may indicate (e.g., in block 1102 and/or in a separate transmission) whether data portions of the first and second MU-MIMO signals start at a same symbol period during a slot or subframe.

According to aspects of the present disclosure, the scheduling entity may indicate whether a same CP length is used for the first and second MU-MIMO signals. For example, the indication in block 1102 may indicate to the first UE and the second UE that the first and second MU-MIMO signals will be transmitted using a normal (e.g., not extended) cyclic prefix length.

In aspects of the present disclosure, the scheduling entity may indicate whether a transmission duration of the first and second MU-MIMO signals is the same or different. That is, the indication in block 1102 may indicate to the first UE and the second UE that the first MU-MIMO signal and the second MU-MIMO signal have different transmission durations. The first UE and the second UE may use the information regarding the transmission duration in demodulating and/or decoding the MU-MIMO signals.

According to aspects of the present disclosure, the scheduling entity may indicate whether a transmission on a set of transmission resources is intended for more than one UE, and if more than one, how many UEs the scheduling entity is transmitting to on the set of transmission resources.

In aspects of the present disclosure, the scheduling entity may indicate whether a same beam (e.g., a transmit beam in a beamforming system) is used for transmitting a MU-MIMO signal to more than one user (e.g., a UE) using a set of transmission resources. A UE receiving a MU-MIMO signal via the beam may use the information that MU-MIMO signals to other UEs are transmitted via the same beam in demodulating and/or decoding the MU-MIMO signal intended for the UE.

According to aspects of the present disclosure, the scheduling entity may indicate whether a same channel coding is used to encode the first MU-MIMO signal and the second MU-MIMO signal. A UE receiving a MU-MIMO signal may use information regarding a channel coding of another MU-MIMO signal sent via the same resources in decoding the MU-MIMO signal.

In aspects of the present disclosure, the scheduling entity may indicate (e.g., signaled at block 1102) a channel coding used for at least one of the first and second MU-MIMO signals.

According to aspects of the present disclosure, the scheduling entity may indicate a phase noise compensation reference signal (PCRS) pattern for PCRS transmitted with the first and second MU-MIMO signals. A UE receiving a first MU-MIMO signals may use the PCRS in detecting phase of the first MU-MIMO signal and in suppressing (e.g., filtering out or canceling) the second MU-MIMO signal from the first MU-MIMO signal.

In aspects of the present disclosure, the scheduling entity may indicate a demodulation reference signal (DMRS) pattern or a UE specific reference signal (UERS) pattern for DMRS or UERS transmitted with the first and second MU-MIMO signals. A UE receiving a first MU-MIMO signal may use the DMRS or UERS in decoding and/or demodulating the first MU-MIMO signal and in suppressing (e.g., filtering out or canceling) the second MU-MIMO signal from the first MU-MIMO signal.

According to aspects of the present disclosure, the scheduling entity may indicate a number of layers used to transmit the first and second MU-MIMO signals.

In aspects of the present disclosure, the scheduling entity may indicate a list of antenna ports used to transmit the first and second MU-MIMO signals. For example, a scheduling entity may indicate a group of four antenna ports that the scheduling entity will use in transmitting the first MU-MIMO signal and another group of four other antenna ports that the scheduling entity will use in transmitting the second MU-MIMO signal.

According to aspects of the present disclosure, the scheduling entity may indicate a ratio of total power level between users. That is, the BS may signal an indication of a ratio of power used to transmit the first MU-MIMO signal to total power used to transmit the first and second MU-MIMO signals.

In aspects of the present disclosure, the scheduling entity may indicate a traffic to pilot (T2P) ratio of power used to transmit data traffic of the first and second MU-MIMO signals to power used to transmit DMRSs with the first and second MU-MIMO signals.

According to aspects of the present disclosure, the scheduling entity may indicate presence of reference signals transmitted with the first and second MU-MIMO signals. The reference signals may be, for example, channel state information reference signals (CSI-RS) and/or measurement reference signals (MRS).

Figure 12:
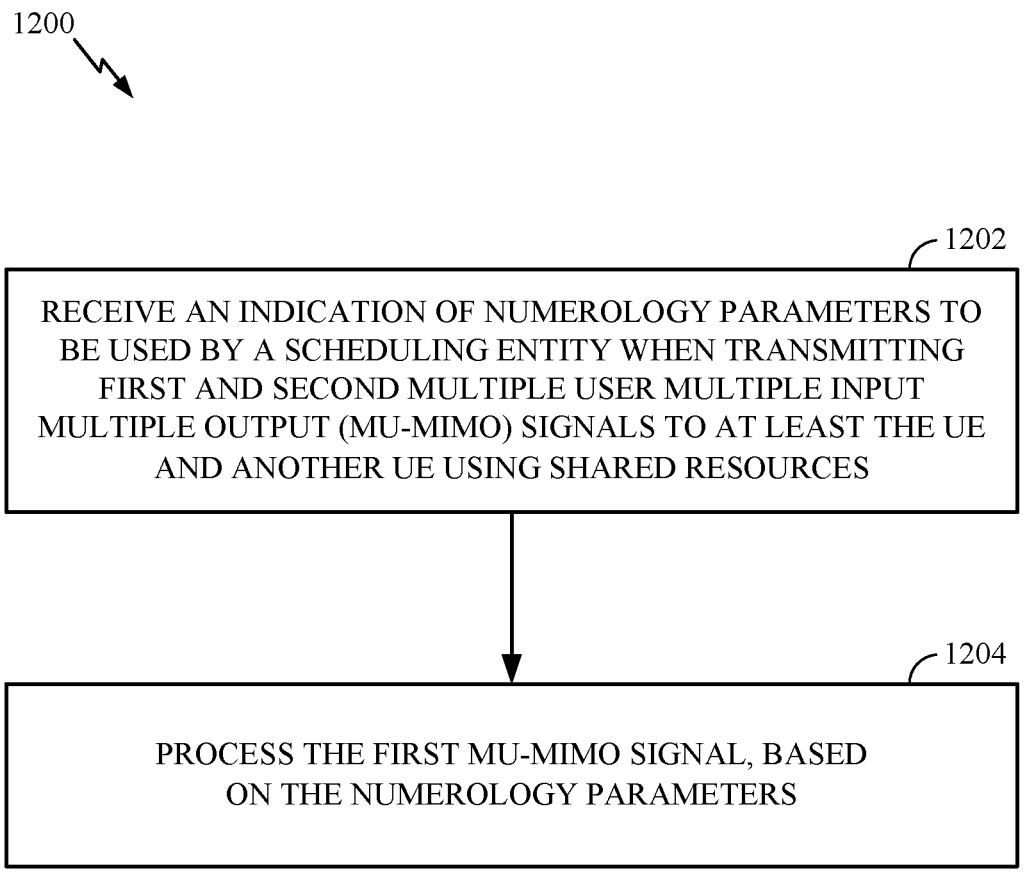
FIG. 12 illustrates example operations that may be performed by a UE, according to aspects of the present disclosure.

FIG. 12 illustrates example operations 1200 that may be performed by a UE, according to aspects of the present disclosure. The UE may be UE 120a in FIG. 1, which may include one or more components illustrated in FIG. 4.

Operations 1200 begin at block 1202 with the UE receiving an indication of numerology parameters to be used by a scheduling entity when transmitting first and second multi-user multiple input multiple output (MU-MIMO) signals to at least the UE and another UE using shared resources. For example, UE 120a may receive an indication that BS 110a will use a numerology based on a 15 kHz tone-spacing when transmitting a first MU-MIMO signal to the UE 120a and another numerology when transmitting a second MU-MIMO signal to the UE 120b.

At block 1204, the UE processes the first MU-MIMO signal, based on the numerology parameters. Continuing the example from above, the UE 120a processes the first MU-MIMO signal based on the numerology that was based on the 15 kHz tone-spacing.

According to aspects of the present disclosure, the UE may estimate, based on the numerology parameters, interference to the first MU-MIMO signal caused by the second MU-MIMO signal and then decode the first MU-MIMO signal based on the estimated interference. Decoding performance of embodiments of the present disclosure may be enhanced when compared with decoding performance of devices using previously known techniques. For example, a UE may be scheduled to receive a first MU-MIMO signal during a period and on a set of frequency resources that are also being used to transmit a second MU-MIMO signal to another UE. Continuing the example, the UE may obtain (e.g., in a control channel or via RRC signaling from a BS) numerology parameters of the second MU-MIMO signal indicating that the second MU-MIMO signal is only being transmitted during a first portion of the period and is not being transmitted during a second portion of the period (see, e.g., FIG. 8B). In the example, the UE may use a first noise variance (e.g., high) while decoding the first MU-MIMO signal during the first portion of the period and a second noise variance (e.g., low) while decoding the first MU-MIMO signal during the second portion of the period, based on the numerology parameters.

According to aspects of the present disclosure, the UE may estimate interference to the first MU-MIMO signal caused by the second MU-MIMO signal and then cancel the interference from the first MU-MIMO signal. The UE may estimate a first interference during a transmit duration of the second MU-MIMO signal and estimate a second interference during a period not overlapping the transmit duration of the second MU-MIMO signal, and then cancel the first interference and second interference from portions of the first MU-MIMO signal in corresponding periods.

In aspects of the present disclosure, the UE may determine a transmission channel estimate (e.g., of the channel from a BS transmitting the MU-MIMO signals to the UE) based on the numerology parameters and the second MU-MIMO signal and then decode the first MU-MIMO signal, based on the transmission channel estimate.

According to aspects of the present disclosure, the UE may receive the indication using a control channel, a medium access control (MAC) control element (MAC-CE) and/or higher layer signaling (e.g., RRC signaling) to indicate one or more numerology parameters for transmissions sharing at least some transmission resources (e.g., time and frequency resources).

In aspects of the present disclosure, the numerology parameters may indicate whether a same numerology is used for the first and second MU-MIMO signals. That is, the indication from the scheduling entity in block 1202 may indicate a numerology and multiple UEs to which the scheduling entity may send MU-MIMO transmissions using the indicated numerology.

According to aspects of the present disclosure, the numerology parameters may indicate whether data portions of the MU-MIMO signals start at a same symbol when those MU-MIMO signals use different numerologies (see, e.g., FIG. 10). That is, the scheduling entity may indicate (e.g., in block 1202 and/or in a separate transmission) whether data portions of the first and second MU-MIMO signals start at a same symbol period during a slot or subframe, and the UE may use the information regarding the symbol periods when the first and second MU-MIMO signals in decoding the first MU-MIMO signal.

According to aspects of the present disclosure, the numerology parameters may indicate whether a same CP length is used for the first and second MU-MIMO signals. For example, the indication in block 1202 may indicate to the UE that the first and second MU-MIMO signals will be transmitted using a normal (e.g., not extended) cyclic prefix length, and the UE may use information regarding the CP length of the first and/or second MU-MIMO signals in decoding the first MU-MIMO signal.

In aspects of the present disclosure, the numerology parameters may indicate whether a transmission duration of the first MU-MIMO signal is the same or different from a transmission duration of the second MU-MIMO signal. That is, the indication in block 1202 may indicate to the UE that the first MU-MIMO signal and the second MU-MIMO signal have different transmission durations. The UE may use the information regarding the transmission duration in demodulating and/or decoding the MU-MIMO signals.

According to aspects of the present disclosure, the numerology parameters may indicate whether a transmission on a set of transmission resources is intended for more than one UE, and if more than one, how many UEs the transmission on the set of transmission resources is intended for. The UE may use information regarding a number of UEs the transmission is intended for in decoding and/or demodulating the first MU-MIMO signal.

In aspects of the present disclosure, the numerology parameters may indicate whether a same beam (e.g., a transmit beam in a beamforming system) is used for transmitting a MU-MIMO signal to more than one user (e.g., a UE) using a set of transmission resources. The UE receiving the first MU-MIMO signal via the beam may use the information that the second MU-MIMO signal is transmitted to one or more other UEs via the same beam in demodulating and/or decoding the first MU-MIMO signal.

According to aspects of the present disclosure, the numerology parameters may indicate whether a same channel coding is used to encode the first MU-MIMO signal and the second MU-MIMO signal. The UE receiving the first MU-MIMO signal may use information regarding a channel coding of the second MU-MIMO signal (sent via the same resources) in decoding the first MU-MIMO signal.

In aspects of the present disclosure, the numerology parameters may indicate a channel coding (e.g., signaled at block 1202) used for at least one of the first and second MU-MIMO signals. The UE receiving the first MU-MIMO signal may use information regarding a channel coding of the second MU-MIMO signal (sent via the same resources) in decoding the first MU-MIMO signal.

According to aspects of the present disclosure, the numerology parameters may indicate a phase noise compensation reference signal (PCRS) pattern for PCRS transmitted with the first and second MU-MIMO signals. The UE receiving the first MU-MIMO signal may use the PCRS in detecting phase of the first MU-MIMO signal and in suppressing (e.g., filtering out or canceling) the second MU-MIMO signal from the first MU-MIMO signal. Distinguishing the first MU-MIMO signal from the second MU-MIMO signal may improve performance of the UE in decoding the first MU-MIMO signal.

In aspects of the present disclosure, the numerology parameters may indicate a demodulation reference signal (DMRS) pattern for DMRS or a UE-specific reference signal (UERS) pattern transmitted with the first and second MU-MIMO signals. The UE receiving the first MU-MIMO signal may use the DMRS or UERS transmitted with the first MU-MIMO signal in decoding and/or demodulating the first MU-MIMO signal. The UE may also use the DMRS pattern and/or the UERS pattern of the first and second MU-MIMO signals in suppressing (e.g., filtering out or canceling) the first MU-MIMO signal from the second MU-MIMO signal. The UE may perform a minimum mean squared error (MMSE) based joint channel estimate using the DMRS pattern(s) of the first and second MU-MIMO signals to determine a channel estimate for the first MU-MIMO channel.

According to aspects of the present disclosure, the numerology parameters may indicate a number of layers used to transmit the first and second MU-MIMO signals. The UE receiving the first MU-MIMO signal may use the information regarding numbers of layers used to transmit the first and second MU-MIMO signals in distinguishing the first MU-MIMO signal from the second MU-MIMO signal and in decoding and/or demodulating the first MU-MIMO signal.

In aspects of the present disclosure, the numerology parameters may indicate a list of antenna ports used to transmit the first and second MU-MIMO signals. The UE receiving the first MU-MIMO signal may use the list of antenna ports (used to transmit the first and second MU-MIMO signals) in distinguishing the first MU-MIMO signal from the second MU-MIMO signal and in decoding and/or demodulating the first MU-MIMO signal.

According to aspects of the present disclosure, the numerology parameters may indicate a ratio of total power level between users. That is, the numerology parameters may signal an indication of a ratio of power used to transmit the first MU-MIMO signal to total power used to transmit the first and second MU-MIMO signals. The UE receiving the first MU-MIMO signal may use the ratio of total power level in determining a noise variance to use while decoding the first MU-MIMO signal.

In aspects of the present disclosure, the numerology parameters may indicate a traffic to pilot (T2P) ratio of power used to transmit data traffic of the first and second MU-MIMO signals to power used to transmit DMRSs with the first and second MU-MIMO signals. The UE receiving the first MU-MIMO signal may use the T2P ratios in decoding and/or demodulating the first MU-MIMO signal.

According to aspects of the present disclosure, the numerology parameters may indicate presence of reference signals transmitted with the first and second MU-MIMO signals. The reference signals may be, for example, channel state information reference signals (CSI-RS) and/or measurement reference signals (MRS). The UE receiving the first MU-MIMO signal may use information regarding presence of reference signals in suppressing (e.g., filtering out or canceling) the first MU-MIMO signal from the second MU-MIMO signal.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for determining, means for processing, means for indicating, and/or means for including may comprise a processing system, which may include one or more processors, such as the transmit processor 420, the TX MIMO processor 430, and/or the controller/processor 440 of the BS 110 illustrated in FIG. 4, and/or the transmit processor 464, the TX MIMO processor 466, and/or the controller/processor 480 of the user equipment 120 illustrated in FIG. 4. Means for transmitting and/or means for sending may comprise a transmitter, which may include the transmit processor 420, the TX MIMO processor 430, the modulators 432, the controller/processor 440, and/or the antenna(s) 434 of the BS 110 illustrated in FIG. 4, and/or the transmit processor 464, the TX MIMO processor 466, the modulators 454, the controller/processor 480, and/or the antenna(s) 452 of the user equipment 120 illustrated in FIG. 4. Means for receiving may comprise a receiver, which may include the receive processor 458, the MIMO detector 456, the demodulators 454, the controller/processor 480, and/or the antenna(s) 452 of the UE 120 illustrated in FIG. 4, and/or the receive processor 438, the MIMO detector 436, the demodulators 432, the controller/processor 440, and/or the antenna(s) 432 of the base station 110 illustrated in FIG. 4.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product/computer readable medium for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a scheduling entity, comprising:
    transmitting, in a control channel, an indication of shared time resources to be used in transmitting first and second multi-user multiple input multiple output (MU-MIMO) signals to first and second user equipments (UEs), wherein the indication further indicates at least one reference signal pattern for reference signals transmitted with the first and second MU-MIMO signals; and
    transmitting the first and second MU-MIMO signals to the first and second UEs, in accordance with the shared time resources.

2. The method of claim 1, wherein the first and second MU-MIMO signals are transmitted using different numerologies.

3. The method of claim 1, wherein the shared time resources comprise at least one of:
    data transmission starting symbol of the first MU-MIMO signal or the second MU-MIMO signal, or
    transmission duration of the first MU-MIMO signal or the second MU-MIMO signal.

4. The method of claim 1, wherein the indication further comprises an indication of at least one of:
    whether a data portion of the first MU-MIMO signal starts at a same symbol as a data portion of the second MU-MIMO signal,
    whether a transmission duration of the first MU-MIMO signal is equal to a transmission duration of the second MU-MIMO signal, or
    a number of UEs scheduled to receive MU-MIMO transmissions using the shared time resources.

5. The method of claim 1, wherein the indication further comprises an indication of at least one of:
    whether the first MU-MIMO signal is transmitted using a same beam as the second MU-MIMO signal,
    a channel coding used for at least one of the first and second MU-MIMO signals, or
    whether the first MU-MIMO signal is transmitted using a same channel coding as the second MU-MIMO signal.

6. The method of claim 1, wherein the at least one reference signal pattern comprises at least one of:
    a phase noise compensation reference signal (PCRS) pattern, or
    a demodulation reference signal (DMRS) pattern.

7. The method of claim 1, wherein the indication further comprises an indication of at least one of:
    a number of layers used to transmit the first and second MU-MIMO signals, or
    a list of antenna ports used to transmit the first and second MU-MIMO signals.

8. The method of claim 1, wherein the indication further comprises an indication of at least one of:
    a traffic to pilot (T2P) ratio of power used to transmit data traffic of the first and second MU-MIMO signals to power used to transmit DMRSs with the first and second MU-MIMO signals, or a ratio of power used to transmit the first MU-MIMO signal to total power used to transmit the first and second MU-MIMO signals.

9. The method of claim 1, wherein the indication further comprises an indication of at least one of:
presence of channel state information reference signals (CSI-RS) transmitted with the first and second MU-MIMO signals, or
presence of measurement reference signals (MRS) transmitted with the first and second MU-MIMO signals.

10. A method for wireless communications by a user equipment (UE), comprising:
receiving, in a control channel, an indication of shared time resources to be used by a scheduling entity when transmitting first and second multi-user multiple input multiple output (MU-MIMO) signals to at least the UE and another UE, wherein the indication further indicates at least one reference signal pattern for reference signals transmitted with the first and second MU-MIMO signals; and
processing the first MU-MIMO signal, based on the shared time resources.

11. The method of claim 10, wherein the processing comprises:
estimating, based on the shared time resources, interference to the first MU-MIMO signal caused by the second MU-MIMO signal; and
decoding the first MU-MIMO signal, based on the estimated interference.

12. The method of claim 11, wherein estimating the interference comprises estimating a first interference during a transmit duration of the second MU-MIMO signal and estimating a second interference during a period not overlapping the transmit duration of the second MU-MIMO signal.

13. The method of claim 10, wherein the processing comprises:
estimating, based on the shared time resources, interference to the first MU-MIMO signal caused by the second MU-MIMO signal; and
canceling the interference.

14. The method of claim 13, wherein estimating the interference comprises estimating a first interference during a transmit duration of the second MU-MIMO signal and estimating a second interference during a period not overlapping the transmit duration of the second MU-MIMO signal.

15. The method of claim 10, wherein the processing comprises:
determining a transmission channel estimate, based on the shared time resources and the second MU-MIMO signal; and
decoding the first MU-MIMO signal, based on the transmission channel estimate.

16. The method of claim 10, wherein the first and second MU-MIMO signals are transmitted using different numerologies.

17. The method of claim 10, wherein the indication of the shared time resources comprise an indication of whether the first and second MU-MIMO signals are transmitted using a same numerology.

18. The method of claim 10, wherein the shared time resources comprise at least one of:
data transmission starting symbol of the first MU-MIMO signal or the second MU-MIMO signal, or
transmission duration of the first MU-MIMO signal or the second MU-MIMO signal.

19. The method of claim 10, wherein the indication further comprises an indication of at least one of:
whether a data portion of the first MU-MIMO signal starts at a same symbol as a data portion of the second MU-MIMO signal,
whether a transmission duration of the first MU-MIMO signal is equal to a transmission duration of the second MU-MIMO signal, or
a number of signals that are present in the first and second MU-MIMO signals.

20. The method of claim 10, wherein the indication further comprises an indication of at least one of:
whether the first MU-MIMO signal is transmitted using a same beam as the second MU-MIMO signal,
a channel coding used for at least one of the first and second MU-MIMO signals, or
whether the first MU-MIMO signal is transmitted using a same channel coding as the second MU-MIMO signal.

21. The method of claim 10, wherein the at least one reference signal pattern comprises at least one of:
a phase noise compensation reference signal (PCRS) pattern, or
a demodulation reference signal (DMRS) pattern.

22. The method of claim 10, wherein the indication further comprises an indication of at least one of:
a number of layers used to transmit the first and second MU-MIMO signals, or
a list of antenna ports used to transmit the first and second MU-MIMO signals.

23. The method of claim 10, wherein the indication further comprises an indication of at least one of:
a traffic to pilot (T2P) ratio of power used to transmit data traffic of the first and second MU-MIMO signals to power used to transmit DMRSs with the first and second MU-MIMO signals, or
a ratio of power used to transmit the first MU-MIMO signal to total power used to transmit the first and second MU-MIMO signals.

24. The method of claim 10, wherein the indication further comprises an indication of at least one of:
presence of channel state information reference signals (CSI-RS) transmitted with the first and second MU-MIMO signals, or
presence of measurement reference signals (MRS) transmitted with the first and second MU-MIMO signals.

25. An apparatus for wireless communications, comprising:
a processor configured to:
cause a transmitter to transmit, in a control channel, an indication of shared time resources to be used in transmitting first and second multi-user multiple input multiple output (MU-MIMO) signals to first and second user equipments (UEs), wherein the indication further indicates at least one reference signal pattern for reference signals transmitted with the first and second MU-MIMO signals; and
cause the transmitter to transmit the first and second MU-MIMO signals to the first and second UEs, in accordance with the shared time resources; and
a memory coupled with the processor.

26. An apparatus for wireless communications, comprising:
a processor configured to:
obtain from a receiver an indication, received in a control channel, of shared time resources to be used by a scheduling entity when transmitting first and second multi-user multiple input multiple output (MU-MIMO) signals to at least a user equipment (UE) comprising the apparatus and another UE wherein the indication further indicates at least one reference signal pattern for reference signals transmitted with the first and second MU-MIMO signals; and process the first MU-MIMO signal, based on the shared time resources; and a memory coupled with the processor.

* * * * *